United States Patent [19]

Taniguchi et al.

[11] Patent Number: 4,847,184
[45] Date of Patent: Jul. 11, 1989

[54] METHOD FOR PRODUCING A LASER-PRINTED PICTURE

[75] Inventors: Itaru Taniguchi, Osaka; Toshiya Katsuragi, Hyogo, both of Japan

[73] Assignee: Kanzaki Paper Manufacturing Co., Ltd., Tokyo, Japan

[21] Appl. No.: 10,317

[22] Filed: Feb. 3, 1987

[30] Foreign Application Priority Data

Apr. 21, 1986 [JP] Japan ................................. 92981

[51] Int. Cl.⁴ .............................................. G03C 5/00
[52] U.S. Cl. .................................... 430/346; 430/945; 346/76 L
[58] Field of Search ............... 430/346, 945, 198, 297; 346/76 L; 144/3 N; 432/13; 250/330; 427/55

[56] References Cited

U.S. PATENT DOCUMENTS

| | | | |
|---|---|---|---|
| 4,394,661 | 7/1983 | Peeters | 346/1.1 |
| 4,419,750 | 12/1983 | Howe | 369/111 |
| 4,520,370 | 8/1985 | Fujii et al. | 346/76 L |

Primary Examiner—Jose G. Dees
Attorney, Agent, or Firm—Morgan & Finnegan

[57] ABSTRACT

Method for producing a picture on the surface of a substrate by laser-printing comprising the steps of:
  generating still video information consisting of a series of gradational signals each of which corresponds to each of picture elements within a predetermined frame;
  preparing a substrate having a surface carbonizable or discolorable with heating;
  generating a laser beam having a sufficient energy to cause the carbonizing or discoloring of said surface;
  modulating the laser beam in accordance with said video information;
  scanning the modulated laser beam in accordance with said video information within said frame; and
  directing and focusing said scanned laser beam to form a sweeping spot over the surface area of said substrate corresponding to said predetermined frame, thereby producing a graphic pattern consisting of picture elements individually gradationally carbonized or discolored.

It is preferred at or after said preparing a substrate, and before said directing and focusing the laser beam to the surface thereof that a carbonizing acceleration agent is applied and penetrated to the surface.

16 Claims, 2 Drawing Sheets

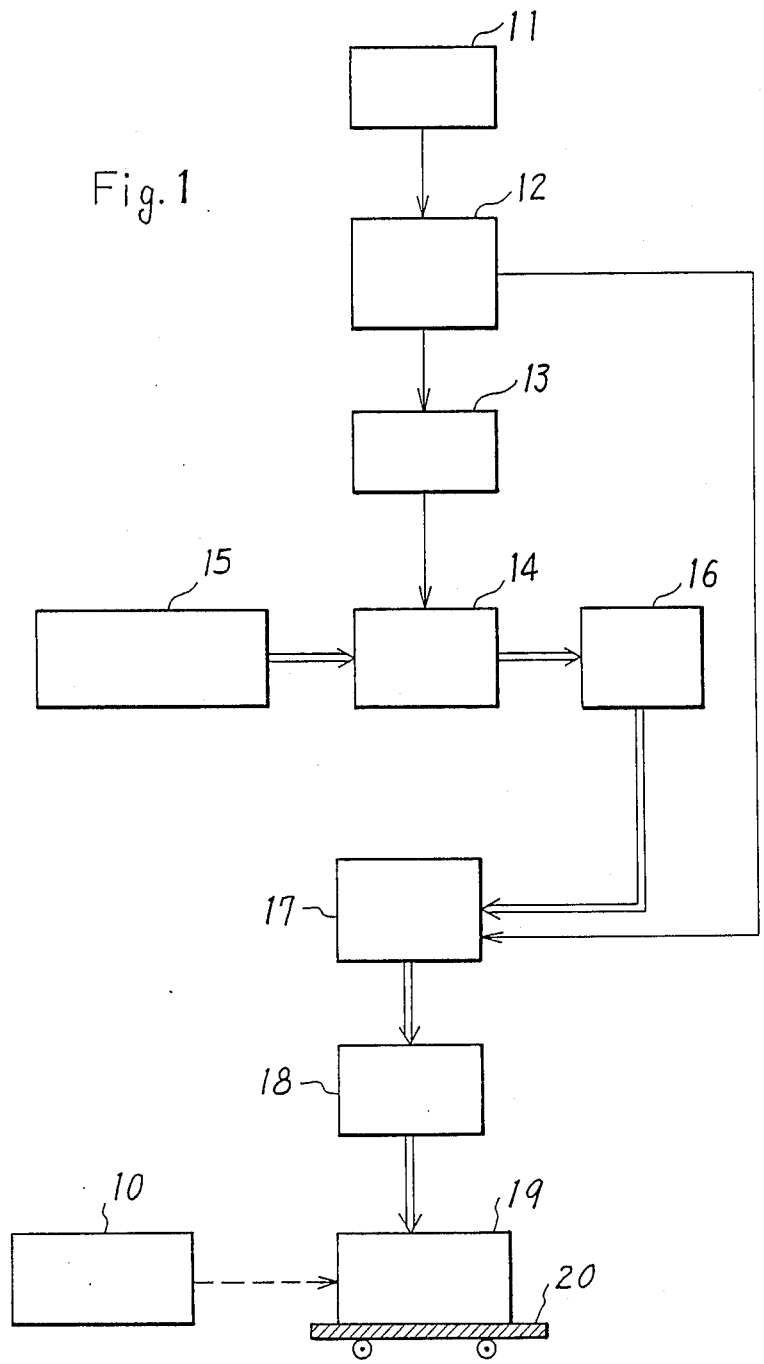

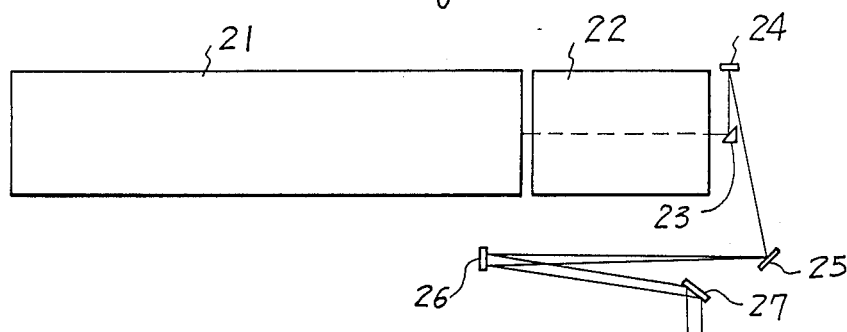
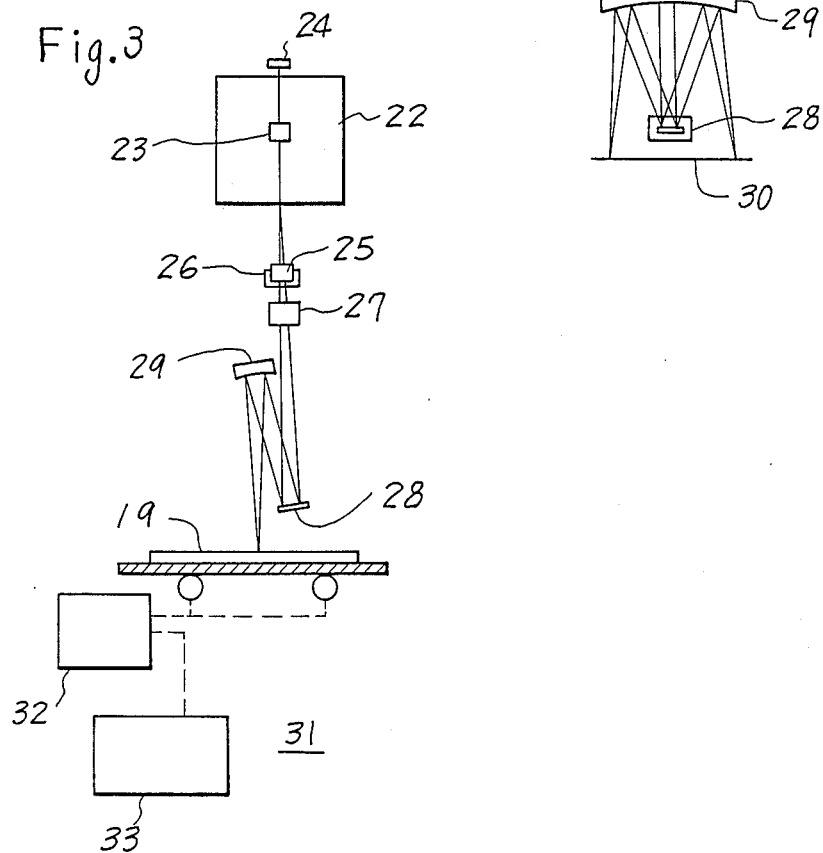

METHOD FOR PRODUCING A LASER-PRINTED PICTURE

TECHNICAL FIELD

The present invention relates to a method for producing a high-quality laser-printed picture on a sheet-like or cylindrical substrate containing wood and/or carbonizable or discolorable constituents.

BACKGROUND ART

Conventionally, carved or printed matters exhibiting figures and/or characters on a sheet substrate or a printing block are made by any contact system using cutlery, or the like. However, recently such carved or printed matter became also made by non-contact system, which mainly uses laser beams. For example, using YAG laser system, it provides means for printing country name, model, and name on the product-name plates of automobiles, motors, and valves or on the surfaces of bearings and electronic parts complete with factory processes, or printing desired numerals, symbols, figures, and the like on ultra-rigid metal, rubber, cloth and plastic surfaces.

To realize the noncontact system mentioned above, there are a variety of systems including masking method for hallmarking through masks made from copper or stainless steel, internal modulation method for internally turning laser-oscillated voltage ON and OFF synchronous with laser scanning operation against materials, or method of applying mechanical shutter synchronous with laser scanning operation. Although these methods eliminates defects from conventional contact systems, quality of the printed and drawn figures or characters are expressed by binary codes, while picture elements are not arranged in the gradational manner. When individually observing these systems provided by the prior art in particular, the internal modulation system and the mechanical shutter system both eliminate mechanical elements for moving the processing object in the directions X and Y. However, only a two-dimensional or plane picture can be evaluated in conjunction with both of these systems, while no sculptural picture can be generated from these systems.

DISCLOSURE OF THE INVENTION

The primary object of the present invention is to provide a novel system and method intended for making sculpturally and gradationally printed pictures by irradiation of laser beams. Another object of the present invention is to provide a novel picture-formation process including steps for promoting carbonization of substrate material when generating patterns constituted from arranged picture elements printed or baked on substrate in the gradational manner.

More particularly, the picture producing process reflecting the first aspect of the present invention comprises the steps of: generating still video information to comprising a series of gradational electrical signals, each corresponding to a picture element within the predetermined frame; preparing substrate material having surface that can thermally be discolored or carbonized; generating laser beams containing sufficient energy to promote either discoloration or carbonization of the prepared material; modulating laser beams in accordance with the video information included in the predetermined frame; scanning the modulated laser beam in accordance with said video information; and directing and focusing the scanned laser beams to the surface of the substrate to generate a sweeping spot to form successive picture elements within the surface area of the substrate corresponding to the predetermined frame thereby generating pictures composed of such picture elements which have gradationally been discolored or carbonized within the above surface area.

A printed unit disclosed in Japanese Patent Application No. 30,988 or 1982 titled as "Laser Thermal Printer" can be used by improving a part thereof, expanding and modifying its function for generating still video information and eventually producing pictures on the surface of selected materials. In brief, the system of producing a laser-printed picture according to the present invention uses either a sheet-like or a cylindrical substrate material substituted for the thermal web used in the laser thermal printer of the above patent application. The system according to the present invention irradiates laser beams containing thermal energy specifically modulated in accordance with the gradational degree per dot (i.e., picture element) onto the surface of the selected substrate material following the predetermined picture-producing pattern without using such a thermal head coming into contact with the surface of selected substrate material, in which modulated laser beams are not generated by causing each dot to turn ON and OFF like the procedure disclosed in the preceding patent application.

The process of producing a laser printed picture of the invention introduces therein such modulation manner as to continuously and gradationally vary the outgoing scan beams according to the desired picture-producing pattern including an acousto-optic (A/O) modulation system, an electro-optic (E/O) modulation system, or a magneto-optic (M/O) modulation system for example.

According to the second aspect of the present invention, in order to produce a gradationally laser-printed picture, the picture-producing substrate having carbonizable surface containing cellulose is first prepared before coating or impregnating carbonization accelerating agent onto or into the prepared material. Then the surface of the substrate is irradiated with modulated scanning laser beams.

ADVANTAGES

Conventionally, when applying an acousto-optical modulator, the deflective light intensity V is calculated by applying the equation shown below using Bragg diffraction area.

$$V = 2 \cdot \left(\frac{\pi}{\lambda}\right)^2 \cdot (Mz) \cdot \left(\frac{L}{H}\right) \cdot Pa$$

where Mz denotes physical constant and Pa denotes an ultrasonic power.

More particularly, the light intensity is proportional to the linear function of ultrasonic power and inversely proportional to the second power of light wave-length, while light intensity itself is dependent on the sectional from L/H of ultrasonic-applied material and proportional to the combination of physical constants of the ultrasonic-applied material.

Concretely, multiple-gradational modulation can be realized by varying the ultrasonic power in accordance with multiple-gradational data related to the original picture information. Energy of deflected laser beams applicable to the printing or the picture formation is directed to the scanning system via a laser-expanding mirror and a reflected-optical-path bending mirror. The scanning system can effectively use either a galvano mirror which is substantially the oscillating reflection mirror capable of varying angles in accordance with current delivered to solenoid or a polygonal mirror. It is also possible for the scanning system to directly scan laser beams by applying optical fibers. Then, the scanned laser beams are directed to the surface of $F.\theta$ mirror being opposite from the prepared material at the end of the scanning system. The scanned laser beams then reflect themselves in accordance with the scanning angle of the scanner before eventually arriving at the corresponding spot position inside the predetermined frame area on the surface of the prepared material. The modulation factor M of the acousto-optic modulation system using cadmium-telluride (Cd-Te) single-crystal is denoted by the equation shown below.

$$M = \sin^2\left(\frac{\pi n_o^3 \gamma \cdot L \cdot V_{app}}{\lambda d}\right)$$

where L denotes the length (mm) of Cd-Te single-crystal, Vapp:the voltage (Volts) applied to Cd-Te single-crystal, d:the aperture (mm) of Cd-Te single-crystal, $\lambda$:the wave-length ($\mu$m) of laser beams, $n_o$:the refractive index of Cd-Te single-crystal/$\lambda$ ($\mu$m), and $\gamma$:the first electro-optic coefficient of Cd-Te single-crystal/$\lambda$ ($\mu$m), respectively. Note that when $\lambda = 10.6$ ($\mu$m), $n_o^3 = 10 \times 10^{-11}$ m/V.

Multiple gradational analog-to-digital (A/D) conversion can be achieved at a very fast speed in accordance with information of the original picture by employing an appropriate data-processing unit. Using a specific digital signal level thus generated, the system according to the present invention varies the modulation factor M by varying the voltage (i.e., Vapp shown in the above equation) being delivered to the laser-beam modulator. This varies the degree of the deflection of laser beams to cause the output laser beams to vary themselves in multi-steps so that either the multiple-gradational character printing or the multiple-gradational picture formation can eventually be achieved.

Application of carbonization-accelerating agent to the picture-producing substrate material effectively promotes dehydration from cellulosic and other sugar ingredients composing the substrate material itself, and allows a substantial increase of carbonized residual constituents in such materials subjected to pyrolysis during exposure to the irradiating laser beams. When the picture-producing substrate holds volatile matters, volume of water among the matters increases to constrain the growth of tar. As a result, more carbon is yielded to eventually allow formation of vivid and dense printed pictures.

The above and other objects and advantages of the present invention will be better understood from the following description in reference to the accompanying drawings.

BRIEF DESCRIPTION OF THE DRAWINGS

FIG. 1 is the simplified block diagram of the system executing the laser-printed picture-producing process according to the invention;

FIG. 2 is the simplified schematic diagram of the laser-printed picture-producing apparatus according to the invention showing its front view; and FIG. 3 is the side view of the laser-printed picture-producing apparatus according to the present invention.

DESCRIPTION OF THE PREFERRED EMBODIMENTS

Referring now to the accompanying drawings, the present invention is described in more detail.

In FIG. 1 which is the simplified block diagram of the laser-printed picture-producing system of the invention, picture-reading device 11 includes either a video camera or any suitable photoelectric scanning means which can generate a series of gradational electric signals each of which corresponds to each of the picture elements of a video scene or original picture in a desired frame. The central processing unit (CPU) 12 is to process the series of gradational electric signals generated by picture-reading device 11 in order that these signals are synchronized with scanning signals suited for use with the frame which contains a picture to be produced on the objective substrate material. Memory associated with CPU 12 is to store the signals processed by the CPU 12 as picture or still-video data. Modulated-signal generator 13 is to generate modulation voltages to be applied to laser-beam modulator 14 which includes either a Ge acousto-optic modulator or a Cd-Te electro-optic modulator. Laser-beam oscillator 15 includes a $CO_2$ laser or a YAG laser to emit laser beams which are then modulated by laser-beam modulator 14. Laser-beam optical system 16 is to adjust the sectional shape of laser beams output from laser-beam modulator 14. Laser-beam scanning system 17 is to scan laser beams emitted from laser-beam optical system 16 in accordance with the scan-instruction signal from the CPU and memory 12. The scanning beam exited from laser-beam scanning system 17 is already modulated by modulator 14 synchronous with the scanning signal, and thus, the scanning beam from the laser-beam scanning system 17 has a specific beam-intensity distribution for each horizontal scanning line in accordance with the corresponding one or predetermined rows of elements on the original video-scene or the original picture. Laser-beam focussing system 18 includes either an $F.\theta$ mirror or an $F.\theta$ lens focussing the scan beam and directing it as a picture elemental beam spot onto a picture-producing substrate 19. The substrate 19 preferrably contains wood or cellulosic material. The picture producing substrate 19 is placed on material table 20 which continuously or intermittently moves in the direction perpendicular to the laser-beam scanning line, while the vertical-pitch interval of horizontal lines on the surface of the picture-producing substrate 19 is established by the movement of the material table 20.

At least three, and preferably four gradations should be applied to the printing-density of picture elements as the corresponding gradational intensity of the laser beam, in the constitution described above. The CPU and memory 12 can preferably be an adequate computer. The system according to the invention can also effectively use the drawing function of a computer for replacing the function of picture-reading device 11. Likewise, the system can project laser beams on all the picture elements in the frame while placing the picture-producing substrate 19 in stationary condition by gradually shifting the laser-beam scanning line in the vertical direction. Furthermore, when employing either the basic material-table movement system or the table stationary system, the picture-producing process of the invention can correctly adjust the overall carbonization level or printing-density level by repeating scanning of laser beams in the fram as many times as desired.

According to the preferred embodiment of the invention, as shown in FIG. 1, before placing the picture-producing substrate 19 on material table 20, a selected carbonization accelerating agent 10 is applied either by coating or impregnation onto or into this material 19. Carbonization of material 19 is accelerated by applying a selected carbonization accelerating agent solely by effect of promoting dehydration from cellulosic material and sugar constituents. Concretely, as described earlier, application of the selected carbonization accelerating agent causes carbonized residual matter to increase in the constituents subjected to pyrolysis. On the other hand, it causes volume of water to increase itself in volatile matter to effectively constrain the growth of tarry components, thus eventually resulting in the significantly improved carbon yield.

Inventors tested a wide variety of chemicals to analyze their aptitude for application to the carbonization accelerating agent needed for help carrying out the invention by classifying chemicals into specific groups shown below. (1) Oxidizing agent, (2) Reduction agent, (3) Metal hydroxide, (4) Acid, (5) Polyvalent metallic chloride, (6) Boric acid salt, (7) Aluminium compound, (8) Organic acid/salt, and (9) Others.

After confirming the test results, inventors compiled Tables 1, 2 and 3, in which those chemicals which proved to have significantly accelerated carbonization are denoted in Table 1, and those chemicals which proved to have slightly accelerated carbonization are denoted in Table 2, whereas those chemicals which proved to have totally failed to accelerate carbonization are shown in Table 3, respectively.

TABLE 1

| | | Chemicals which have significantly accelerated carbonization |
|---|---|---|
| 1. | Oxidizing agent | $KMnO_4$, $(NH_4)_2S_2O_8$, $NaClO$, $NaIO_4$, $K_2S_2O_8$, $NaClO_2$, $KIO_3$, $FeCl_3$, $K_2Cr_2O_7$, $AgNO_3$, $H_2O_2$ |
| 2. | Reduction agent | $Na_2S$, $NaF$, $Na_2S_2O_4$, $NaBH_4$ |
| 3. | Metal hydroxide | $LiOH$, $NaOH$, $Ba(OH)_2$, $(KOH)$ |
| 4. | Acid | $H_2SO_4$, $H_3PO_4$, $H_3BO_3$ |
| 5. | Polyvalent metallic chloride | $ZnCl_2$, $SnCl_2$ |
| 6. | Boric acid salt | $KBO_2$, $K_2B_4O_7$, $Na_2B_4O_7$ |
| 7. | Aluminium compound | $NaAlO_2$ |
| 8. | Organic acid salt | Potassium hydrogen phthalate Potassium antimony tartrate |
| 9. | Others | $FeSO_4(NH_4)_2SO_4$, $Na_2HPO_4$, $(NH_4)_2HPO_4$, $NaHCO_3$, $Na_2CO_3$, $NH_4H_2PO_4$, $NaSCN$, $Zn(NO_3)_2$, $KI$ |

TABLE 2

| | | Chemicals which have slightly accelerated carbonization |
|---|---|---|
| 1. | Oxidizing agent | $NH_4NO_3$, $NaClO_4$, $(Na_2Cr_2O_7)$ |
| 2. | Reduction agent | $NaSO_3$, $NaHSO_3$, $Na_2S_2O_3$, $NaNO_2$, $(ZnS_2O_4)$ |
| 3. | Metal hydroxide | |
| 4. | Acid | $(HNO_3)$ |
| 5. | Polyvalent metallic chloride | $NiCl_2$, $CaCl_2$ |
| 6. | Boric acid salt | |
| 7. | Aluminium compound | High-basic aluminium salt Acrylic acid aluminium Aluminium sulphate, $K_2Al_2(SO_4)_2$ |

TABLE 2-continued

| | | Chemicals which have slightly accelerated carbonization |
|---|---|---|
| | | Polyaluminium hydroxide |
| 8. | Organic acid salt | Sodium acetate, Zinc acetate Barium acetate, Sodium citrate Sodium benzoate Sodium propionate Potassium sodium tartrate |
| 9. | Others | $Mg(NO_3)_2$, $Ca(NO_3)_2$, $LiNO_3$, $ZnSO_4$, $(NH_4)_2SO_4$, $NH_4Cl$, $K_4Fe(CN)_6$ |

TABLE 3

| | | Chemicals which have not accelerated carbonization at all |
|---|---|---|
| 1. | Oxidizing agent | $CuSO_4$, $Ba(ClO_4)_2$, $(NH_4)_2Cr_2O_7$, $KNO_3$, $Ba(ClO_3)_2$ |
| 2. | Reduction agent | Formic acid |
| 3. | Metal hydroxide | |
| 4. | Acid | HCL Citric acid, Succinic acid DL-malic (Apple) acid Itaconic acid |
| 5. | Polyvalent metallic chloride | |
| 6. | Boric acid salt | |
| 7. | Aluminium compound | |
| 8. | Organic acid salt | Ammonium acetate, Calcium acetate Zinc tartrate Sodium monochloroacetic acid |
| 9. | Others | Cationic starch, Ethylenediamine Glycol, Monoethanolamine |

Referring now to FIGS. 2 and 3, the constitution of the laser-printed picture-producing apparatus related to the present invention is described below.

See FIG. 2. The reference numeral 21 denotes $CO_2$ gas laser beam oscillator. Acousto-optic modulator 22 includes single-crystal germanium (Ge) elements for modulating laser beams emitted from $CO_2$ gas laser beam oscillator 21 into a nalogue powers. Laser beams modulated from acousto-optic modulator 22 are directed to galvano mirror 28 via bending mirror 23, beam-expanding mirror 24, bending mirror 25, beam-expanding mirror 26, and another bending mirror 27. Scanner including galvano mirror 28 is provided with $F.\theta$ mirror 29 which reflects laser beams entered into a specific range corresponding to the scanning angle of scanner 28 before eventually allowing laser beams to arrive at the corresponding spot position on the objective material surface 30.

FIG. 3 is the side view of the optical scanning system comprised of mirrors 23 through 27, galvano mirror 28, and $F.\theta$ mirror 29, and in addition, FIG. 3 also denotes the detailed material-feeding system. This material-feeding system 31 dealing with material-table 20 as shown in FIG. 1 is provided with material-feeding stepping motor 32 and motor drive 33, respectively.

The above preferred embodiment introduces a sealed-off type $CO_2$ gas laser beam oscillator having 75 W of power output and an acousto-optic modulator containing germanium elements which effectively uses photo Bragg diffraction generated by acoustic beams. To drive the above acousto-optic modulator, the laser-printed picture-producing system according to the present invention has introduced as a driver, analogue-type RF power-supply source having 70 MHz of the center frequency and 1 Vp-p($\pm 0.5$ V-to-the ground) of the input video voltage and an RF amplifier capable of amplifying the input power to a maximum of 50 W of the RF power. According to the test result, the above acousto-optic modulator has achieved analogue modulation (i.e., Bragg diffraction) by applying the input video voltage 1 Vp-p, at DC through a maximum of 1 GHz of frequencies, more desirably, 10KHz through a maximum of 3 MHz of square waves to the above driver. Also, according to the test result, at least 100 meters/min. of the printing speed was needed for generating 100 through 150 $\mu$m of the spot diameter for the primary light of the acousto-optic modulated light (i.e., Bragg diffration) and the picture-producing material made from wood. It was also possible for the system to apply zero-order light of the acousto-optic modulated light. This method enabled the system to execute printing operations at a speed of about 1.5 times faster than the above case.

When applying electro-optic modulator instead of the acousto-optic modulator during the test, the system introduced a sealed-off type $CO_2$ gas laser beam oscillator having a maximum of 16 W power output. Cadmium-telluride (Cd-Te) electro-modulator 22 properly controls electric field to be applied to the predetermined direction of crystals and modulates laser beams by means of Pockels effect.

To implement the needed test, the system used a squarewave oscillator generating ±2.5 KV of peak value and 1 KHz through a maximum of 1 GHz, desirably 10 KHz through a maximum of 3 MHz of frequencies for driving the electro-optic modulator mentioned above. Galvano mirror 28 provided sufficient scanning speed in conjunction with the spot diameter of the laser beams incident upon the substrate material surface 30. According to a test in which a wooden sheet was used for the substrate material, it was a necessary condition for the system to execute the printing operation at about 20 meters per minute of the print-line speed for achieving 100 $\mu$m of the thermal spot diameter. When using the system constitution described above, as a whole, modulated laser beams were directed onto the substrate surface with about 20% of attenuation, thus eventually allowing the system to achieve a minimum of 1 $\mu$m of the depth of printed or baked depth per dot at about 1000 seconds of the printing speed to fully produce satisfactory characters and pictures on an A-4 size substrate material. Inventors confirmed that aluminium and gold proved to be significantly effective for application to reflection coating agent on those reflective optical system components 23 including galvano mirror and mirrors 24 through 29.

INDUSTRIAL APPLICABILITY

As is clear from the foregoing description, the laser-printed picture-producing system according to the invention is effectively applied to sheet-like or cylindrical substrate material made from wood, plastics, rubber, cloth and other materials, while providing a novel method of producing vivid picture having an adequate depth in accordance with the gradation by applying modulated laser beams without causing thermal head to come into contact with the substrate material. Furthermore, the system according to the invention securely improves picture quality and the efficiency of the picture-producing processes by coating or impregnating selected carbonization accelerating agents onto or into substrate surface in advance of activating the system operation, or by merely applying it via spray means as required, thus resulting in the accelerated carbonization of picture portion, which in turn produces the improved picture quality and better efficiency of the picture-producing processes as mentioned above.

While the preferred embodiment of the invention has been illustrated in detail, modifications and adaptations of that embodiment will be apparent to those skilled in the art. However, it is to be expressly understood that such modifications and adaptations are within the spirit and scope of the present invention, as set forth in the following claims.

We claim:

1. A method for producing a picture on surface of a substrate by laser-printing, comprising the steps of:
   generating still video information comprising a series of gradational signals, each of said signals corresponding to each of picture elements with a predetermined frame;
   preparing said substrate surface, wherein said surface is carbonizable or discolorable with heating;
   generating a laser beam having a sufficient energy to cause carbonizing or discoloring of said surface;
   modulating the laser beam in accordance with said gradational video information;
   scanning the modulated laser beam in accordance with said gradational video information within said frame; and
   directing and focusing said scanned laser beam to form a sweeping spot over the surface area of said substrate corresponding to said predetermined frame, thereby producing a graphic pattern comprising picture elements, wherein said elements are individually, gradationally engraved, carbonized or discolored.

2. The method of claim 1 wherein the laser beam is generated by a $CO_2$ g as laser with the wavelength of about 10.6 $\mu$m.

3. The method of claim 1 wherein the laser beam is generated by a YAG laser with the wavelength of about 1.06 $\mu$m.

4. The method of claim 1 wherein the modulating of the laser beam is carried out by a Ge acousto-optic modulator.

5. The method of claim 1 wherein the modulating of the laser beam is carried out by a Cd-Te electro-optice modulator.

6. The method of claim 1 wherein each of said gradational signals has a magnitude at any one of at least three gradations.

7. The method of claim 1 wherein said substrate is made of wood.

8. The method of claim 1 wherein all the horizontal scanning lines by the laser beam are repeated along one reference line, while said substrate is shifted in the direction perpendicular to said reference line.

9. The method of claim 1 wherein said surface of the substrate is engraved in the depth according to the gradational discoloring or carbonizing of said surface by laser irradiation.

10. Method for producing a picture on the surface of a substrate with a carbonization accelerating agent by laser-printing, comprising the steps of:
    generating still video information comprising a series of gradational signals, each of which corresponds to each of picture elements within a predetermined frame;
    preparing a substrate having a carbonizable surface by applying a carbonizing acceleration agent to the surface, wherein the agent penetrates the surface, and
wherein the substrate includes a constituent of cellulosic material;

generating a laser beam having a sufficient energy to cause the carbonizing or discoloring of said surface;

modulating the laser beam in accordance with said video information;

scanning the modulated laser beam in accordance with said video information within said frame; and directing and focusing said scanned laser beam to form a sweeping spot over the surface area of said substrate corresponding to said predetermined frame, thereby producing a graphic pattern comprising picture elements individually gradationally carbonized or discolored.

11. The method of claim 10 wherein the laser beam is generated by a $CO_2$ gas laser with the wavelength of about 10.6 μm.

12. The method of claim 10 wherein the laser beam is generated by a YAG laser with the wave length of about 1.06 μm.

13. The method of claim 10 wherein the modulating of the laser beam is carried out by a Ge acousto-optic modulator.

14. The method of claim 10 wherein the modulating of the laser beam is carried out by a Cd-Te electro-optic modulator.

15. The method of claim 10 wherein each of said gradational signals for each picture element has a magnitude at any one of at least three gradations.

16. The method of claim 10 wherein said substrate is made of wood.

* * * * *

UNITED STATES PATENT AND TRADEMARK OFFICE
CERTIFICATE OF CORRECTION

PATENT NO. : 4,847,184
DATED : July 11, 1989
INVENTOR(S) : Itaru Taniguchi et al Page 1 of 2

It is certified that error appears in the above-identified patent and that said Letters Patent is hereby corrected as shown below:

In Column 1, line 33, "eliminates" should read -- eliminate --; line 38, a comma (,) should be inserted after "art"; line 58, delete "to".

In Column 2, line 9, "or" should read -- of --.

In Column 3, lines 21-25, in the equation, change $$ M = \sin^2 \left( \frac{\pi n_0^3 \gamma \cdot L \cdot V_{app}}{\lambda d} \right) $$

to read :

$$ -- \quad M = \sin^2 \left( \frac{\pi n_0^3 \tau \cdot L \cdot V_{app}}{\lambda d} \right) \quad --; $$

line 31, "γ: the first" should read -- τ: the first --; line 34, -- τ -- should be inserted before "= 10 x $10^{-11}$ m/V."

In Column 4, line 42, "or" should read -- of --; line 48, "preferrably" should read -- preferably --.

UNITED STATES PATENT AND TRADEMARK OFFICE
CERTIFICATE OF CORRECTION

PATENT NO. : 4,847,184

DATED : July 11, 1989

INVENTOR(S) : Itaru Taniguchi et al

It is certified that error appears in the above-identified patent and that said Letters Patent is hereby corrected as shown below:

In Column 7, line 12, "diffration" should read -- diffraction --.

Signed and Sealed this

Twenty-eighth Day of August, 1990

Attest:

HARRY F. MANBECK, JR.

*Attesting Officer*        *Commissioner of Patents and Trademarks*